N. C. FLUCK.
Machines for Cutting Cloth.
No. 144,023. Patented Oct. 28, 1873.
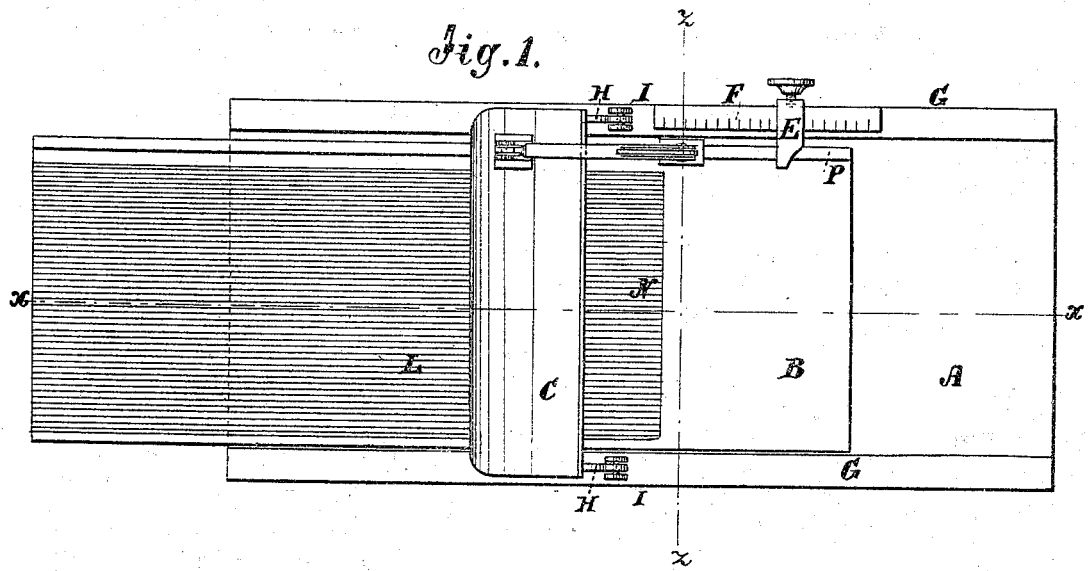
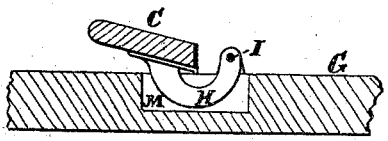
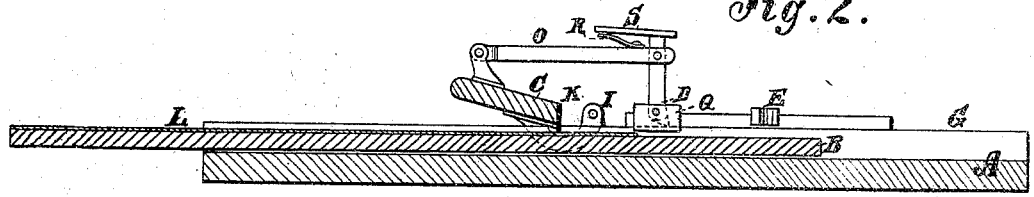
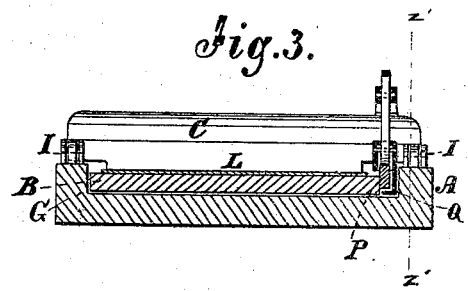
Witnesses:
A Bennerkendorf
Sedgwick
Inventor:
N.C. Fluck
Per
Munn & Co.
Attorneys.

UNITED STATES PATENT OFFICE.

NATHANIEL C. FLUCK, OF GLOUCESTER, ENGLAND.

IMPROVEMENT IN MACHINES FOR CUTTING CLOTH.

Specification forming part of Letters Patent No. 144,023, dated October 28, 1873; application filed March 22, 1873.

*To all whom it may concern:*

Be it known that I, NATHANIEL C. FLUCK, of Gloucester, in England, have invented a new and Improved Sample-Cutter, of which the following is a specification:

My invention consists of a movable cutting table or board on a stationary bed, a guide for the cutting-knife, a pawl for moving the cutting-table, and an adjustable stop and a gage for regulating the movement, all combined in a manner by which the cutting of cloth strips into sample pieces of any size required is simplified and facilitated.

Figure 1 is a plan view of my improved machine. Fig. 2 is a longitudinal sectional elevation taken on the line $x$ $x$. Fig. 3 is a transverse section taken on the line $z$ $z$; and Fig. 4 is a section on the line $z'$ $z'$ of Fig. 3.

Similar letters of reference indicate corresponding parts.

A is the bed-plate; B, the movable board; C, the cutting-guide; D, the pawl; E, the adjustable stop, and F the gage. The bed-plate has a rib or guide, G, on the upper side at each edge, between which the movable board fits so as to slide forward and backward. The cutting-guide C is jointed by arms H to ears I on the ribs G, so as to swing forward and back. The edge K, when the guide is made of wood, is shod with metal and beveled, so as to be vertical, or thereabout, when in the position shown in the drawing, which is that in which it is used for guiding the knife for cutting the cloth. Its lower edge rests on the strip L of cloth to be cut, being held in this position by the arms H, which are attached to the under side of the guide, and extend down in recesses M, and up in front of edge K when they are pivoted to the ears I, and thus hold the guide so that a knife in the hand of the operator may be guided straight across the strip of cloth to cut off a sample, N. The long arm of the pawl D is connected, by means of the rod O, to the guide C, as shown, so that when a sample has been cut off, and it is desired to move the strip along to adjust it for cutting off another, it can be readily done by swinging the guide C upward, and which causes the pawl to tip forward and bind upon the metal bar P fixed to one edge of the movable board, and push the latter along as the guide is swung farther upward and forward. The pawl is pivoted to the shoe Q fitted on said bar, so as to slide on it freely when the pawl does not bind it to the bar—that is, when the guide C is moved down and back.

The extent of forward movement of the board B and the cloth upon it is regulated for the required length of the samples by the stop E, against which the shoe of the pawl strikes, and by which it is arrested. Guide C is then swung back down on the cloth, ready for guiding the knife for cutting off the sample. The gage F shows where to fix the stop for samples of the length required.

The spring R and arm S hold the pawl so as to insure its engagement with the bar P, and allow it to slide freely over the bar during the back movement of the shoe.

The metal edge K of the guide C projects a little below the edge of the guide, and presses on the cloth to hold it so that it will not be moved by the knife. The bed-plate A may be mounted on legs or laid on a table or bench.

Having thus described my invention, I claim as new and desire to secure by Letters Patent—

1. The combination of the bed-plate A, movable board B, guide C, connecting-rod O, and pawl D, substantially as described.

2. The combination, with the bed-plate A, movable board B, guide C, connecting-rod O, and pawl D, of an adjustable stop, E, and a scale, F, substantially as specified.

3. The combination of the shoe Q, pawl D, spring R, and the rod O with the movable board B, the cutter-guide C, and the hinged arms H, substantially as specified.

The above specification of my invention signed by me this 11th day of December, 1871.

NATHANIEL CLISSOLD FLUCK.

Witnesses:
   THOS. SMITH,
      *Notary Public, Gloucester.*
   DANL. FRANKLIN,
      *Clerk to Mr. Smith.*